United States Patent [19]
Jones

[11] Patent Number: 6,045,328
[45] Date of Patent: Apr. 4, 2000

[54] FLUID DAMPER INCLUDING FLEXIBLE DAMPING PLATE

[75] Inventor: Peter J. Jones, Erie, Pa.

[73] Assignee: Lord Corporation, Cary, N.C.

[21] Appl. No.: 09/159,293

[22] Filed: Sep. 23, 1998

[51] Int. Cl.[7] ............................................. B63H 5/10
[52] U.S. Cl. ................... 416/140; 416/106; 416/134 A; 267/140.13; 267/141.1; 248/562; 248/636
[58] Field of Search .................... 416/106, 107, 416/134 A, 140, 141, 134 R, 500; 267/140.11, 140.13, 140.4, 141.1, 141.4; 248/562, 636, 638

[56] References Cited

U.S. PATENT DOCUMENTS

| | | |
|---|---|---|
| 3,141,523 | 7/1964 | Dickie . |
| 3,154,273 | 10/1964 | Paulsen . |
| 3,758,230 | 9/1973 | Potter . |
| 3,874,646 | 4/1975 | Vernier . |
| 4,105,365 | 8/1978 | Ferris et al. . |
| 4,566,677 | 1/1986 | Le Pierres . |
| 4,725,046 | 2/1988 | Sugino . |
| 4,770,396 | 9/1988 | Jouade . |
| 4,778,343 | 10/1988 | Hahn et al. . |
| 4,779,585 | 10/1988 | Behrens et al. . |
| 4,790,521 | 12/1988 | Ide et al. . |
| 4,811,919 | 3/1989 | Jones . |
| 4,893,988 | 1/1990 | Sato . |
| 5,092,738 | 3/1992 | Byrnes et al. . |
| 5,127,607 | 7/1992 | McGuire . |
| 5,197,692 | 3/1993 | Jones et al. . |
| 5,374,039 | 12/1994 | Schmidt et al. . |
| 5,413,320 | 5/1995 | Herbst . |
| 5,501,434 | 3/1996 | McGuire . |
| 5,540,549 | 7/1996 | McGuire . |
| 5,762,295 | 6/1998 | McGuire et al. . |
| 5,988,610 | 11/1999 | Hiraki et al. ........................ 267/140.13 |

OTHER PUBLICATIONS

SAE Technical Paper Series, 862052, *The New Generation of Engine Mounts*, H.J. Taylor, Jr. pp. 1–7, 1986, Society Of Automotive Engineers, Inc.

*Primary Examiner*—Edward K. Look
*Assistant Examiner*—Liam McDowell
*Attorney, Agent, or Firm*—Randall S. Wayland; Wayne W. Rupert; James W. Wright

[57] ABSTRACT

A fluid and elastomer damper includes a first and second members and an elastomer section flexibly mounting the second member to the first member and allowing lateral movement therebetween. The elastomer section includes an inner wall forming a portion of a cavity defined within the damper and a damping fluid disposed within the cavity. A flexible damping plate separates the cavity into first and second chambers. At least one passageway is formed between the damping plate and the inner wall, the passageway exhibiting a gap dimension between the wall and the damping plate. When lateral movement occurs between the first and second members, the gap dimension is maintained substantially constant by flexing of the damping plate along the lateral direction.

22 Claims, 10 Drawing Sheets

FLUID DAMPER INCLUDING FLEXIBLE DAMPING PLATE

FIELD OF THE INVENTION

This invention relates to damping devices and, more particularly, to fluid-and-elastomer mountings and dampers for supporting static loads and providing vibration damping between relatively vibrating components.

BACKGROUND OF THE INVENTION

Damping of mechanical vibrations, as opposed to isolation of vibrations, may be desirable in some applications to reduce dynamic motions. Usually, damping is required in systems which are load controlled, i.e., where loads applied to the system cause dynamic oscillatory motions. Adding large amounts of hysteretic damping to these systems can reduce such motions. One application where high damping may be required is in the so-called hingeless or flexbeam rotor system of a helicopter. Typically, these composite rotor systems do not exhibit sufficient internal damping to damp lead-lag motions. As such, a lead-lag damper may be required to provide supplemental damping to the system. Prior art systems have greatly increased system damping by the addition of passive elastomeric dampers with resulting reductions in rotor blade lead-lag motions.

One such passive elastomeric damper is described in U.S. Pat. No. 4,778,343 to Hahn et al., the disclosure of which is hereby incorporated by reference herein. The Hahn '343 patent describes a composite rotor system which utilizes dual elastomer dampers 9 to damp lead-lag motions. At the same time, these dampers 9 also react to flapping loads. The dampers are generally used in opposed pairs, one on the top of the pitch case (otherwise referred to as the cuff) and one on the bottom thereof. An elastomeric bearing 8 interconnects the dampers 9 to the blade root 2.1. These passive dampers 9 are bonded in highly damped polymers (loss factors of 0.5 or more). The highly damped material hysteretically damps the motion of the blades by converting motion into heat.

U.S. Pat. No. 5,092,738 to Byrnes et al., which is hereby incorporated by reference herein, describes another passive damper system including damper units 52 for a hingeless or flexbeam rotor system. The Byrnes et al. '738 patent describes the use of a spherical elastomeric bearing 64 to perform a centering function, accommodate torsional and cocking motions, and react to flapping loads.

U.S. Pat. No. 4,893,988 to Sato teaches yet another passive damper system including an elastomeric pivot 7 interconnected to elastomeric dampers 9 to a flex beam 2. The blade 4 and pitch sleeve 3 attach to the outboard end of the flex beam 2.

An elastomeric lead-lag damper for a more conventional helicopter rotor system is described in the commonly assigned U.S. Pat. No. 3,758,230 to Potter.

As an improvement over passive elastomer dampers, damper devices have been developed which utilize combinations of fluid and elastomer to increase damping levels and linearity achievable by passive elastomer dampers. U.S. Pat. No. 5,374,039 to Schmidt et al., which is incorporated by reference herein, describes a fluid and elastomer damper 20 for use on an articulated rotor system. The damper utilizes a fluid contained within the damper which is throttled back and forth between opposed chambers 26, 28 and through fluid passageways 68 to create additional damping over and above what is available from elastomeric dampers (hysteresis) alone. These dampers 20 will be referred to herein as throttled-type dampers. The damper further includes means for limiting the dynamic pressure buildup therein.

These throttled-type dampers produce fluid damping in addition to the hysteretic damping. However, although these throttled-type dampers provide excellent properties, a simpler construction may be needed in some applications. Furthermore, providing multiple fluid cavities can require volume that may not be available in some applications. This is especially true in helicopter rotor applications, in which any increase in the size of the damper can mean more exposure to the air stream and, thus, an increase in the drag on the rotor blade system. In addition, without proper sizing of the passages and proper viscosity, throttled-type dampers tend to be somewhat nonlinear.

A fluid and elastomer damper for a more conventional helicopter rotor system is described in U.S. Pat. No. 4,566,677 to LePierres where fluid passes between chambers 23, 24 through working passages 25.

The prior art also describes devices which utilize an inner member or piston for moving through a fluid, as opposed to throttling, to provide additional nonhysteretic damping (referred to herein as piston type dampers). U.S. Pat. No. 3,874,646 to Vernier, U.S. Pat. No. 3,154,273 to Paulsen, U.S. Pat. No. 3,141,523 to Dickie, U.S. Pat. No. 4,790,521 to Ide et al., U.S. Pat. No. 4,779,585 to Behrens et al., and U.S. Pat. No. 4,770,396 Jouade, describe piston type devices in which a piston is used in a closed cavity which includes a viscous fluid. Movement of the piston within the cavity causes a stirring of the fluid, thus increasing damping over and above that available from the elastomer alone.

U.S. Pat. No. 5,540,549 to McGuire teaches a piston type damper with particular applicability to the hingeless rotor system. The damper 20 includes a piston 38 moveable in a cavity 34 full of viscous fluid 36. The piston moves within the cavity 34 as a result of relative movement between the inner member 22 and the outer member 24, thereby causing the fluid 36 to flow about the piston 38 and through a flow area. The damping force created comprises a throttling component from the fluid flowing through the flow area and a viscous drag component developed from the fluid acting on a surface area of the piston. Notably, the piston 38 is rigidly connected to the inner member 22, thus the gaps must be set wide enough to accommodate static motions due to flexing of the flexible section 28. That is, the adjacent walls of the outer member 24 are displaced with respect to the side edges of the piston 38 whereby the areas of the passages (gaps) defined therebetween are altered. This can detract from the effectiveness of the damper in that the gaps must be set wider than desired to accommodate such static motions.

Another problem presented by the afore described design relates to the sizes of the gaps or passages. Smaller passages allow more damping to be generated for a particular fluid of a given viscosity. Generally, more viscous fluids must be employed to obtain the same damping from larger gaps. It is desirable that the fluid be of relatively low viscosity because lower viscosity fluids tend to maintain a more uniform viscosity over a wider range of operating temperatures. On the other hand, the damper must accommodate an anticipated amount of lateral deflection of the elastomer section. The passages must be large enough to allow the damper to move through its full range of deflection without causing contact between the various components therein. Thus, in order to prevent interference between the components, it may be necessary to provide fluid passageways which are larger than would otherwise be desired.

Another problem which may be experienced with dampers for attaching between a rotor cuff and a rotor flexure (in which the damping devices of the type have an elastomer section comprised of laminated shims and elastomer layers) is that the bond between an elastomer layer and an attached shim may fail. When this occurs, for example, under high pitch conditions, the clastomer section may separate from the inner member, whereupon the pivot point between the cuff and the flexure may be lost.

SUMMARY OF THE INVENTION

In view of the foregoing, the present invention provides a fluid-and-elastomer damper having substantially uniform damping characteristics through a wide range of motion. The invention also provides such a damper wherein the size of a fluid passage or passages may be reduced to obtain improved damping linearity. Moreover, the damper according to the invention provides more consistent and uniform damping characteristics through a wide range of operating temperatures.

In another aspect, the invention provides a damper of the type having an elastomer section secured to a base member for pivotal movement which resists failure of the pivoted connection in the event of separation within the elastomer section. The invention has particular utility as a fluid-and-elastomer, lead-lag damper for helicopter rotors which can carry vertical flap and pitch link loads, accommodate pitch motions and damp leadlag motions. Accordingly, the invention provides a fluid-and-elastomer, lead-lag damper for use on a helicopter rotor system which provides rotor blade damping with improved linearity as a function of amplitude. The invention is particularly suitable for use on bearingless rotor systems.

Accordingly, the present invention, which is directed to a fluid and elastomer damper which is particularly well-suited for damping lead-lag motions of a helicopter rotor system, but may be used for other applications in which damping is desired as well. The damper employs both hysteretic damping, provided by an elastomer section, and fluid damping, provided by movement of a fluid through a passageway. The passageway is defined between an inner wall of an elastomer section and a damping plate. The damping plate is flexible such that it conforms to the shape of the elastomer section as the elastomer section is flexed (for example, when the damper is mounted on a helicopter in flight). This flexibility facilitates the area of the passageway may be maintained substantially constant. In this way, substantially constant damping values may be achieved.

More particularly, the present invention is directed to a damper including a first member and a second member. An elastomer section flexibly mounts the second member to the first member and allows lateral movement therebetween and includes an inner wall. A cavity is defined within the damper and a damping fluid is disposed within the cavity. A flexible damping plate separates the cavity into first and second chambers. At least one passageway is formed between the damping plate and the inner wall of the elastomer section. When the inner wall is displaced along a lateral direction, the damping plate is flexed along the lateral direction a corresponding distance. Preferably, when lateral movement occurs between the first and second members in the lateral direction, a gap dimension defined between the damping plate and the inner wall is maintained substantially constant by flexing of the damping plate along the lateral direction. Preferably, the flexibly damping plate connects between the first and second members.

The damper may include a volume compensator for controlling a pressure within the cavity. The first member may be adapted to be mounted on a rotor cuff of a helicopter and the second member may be adapted to be mounted on a rotor flexure (flex beam) of the helicopter.

The present invention is further directed to a damped helicopter rotor system including a rotor flexure adapted to be connected to a helicopter blade, a rotor cuff surrounding a portion of the rotor flexure, and a damper as described above.

BRIEF DESCRIPTION OF THE DRAWINGS

The accompanying drawings, which form a part of the specification, illustrate key embodiments of the present invention. The drawings and description together serve to fully explain the invention. In the drawings.

DETAILED DESCRIPTION OF THE PREFERRED EMBODIMENT

The present invention now will be described more fully hereinafter with reference to the accompanying drawings, in which an embodiment of the invention are shown. This invention may, however, be embodied in many different forms and should not be construed as limited to the embodiment set forth herein; rather, this embodiment is provided so that this disclosure will be thorough and complete, and will fully convey the scope of the invention to those skilled in the art. In the drawings, like numbers refer to like elements throughout.

Figure 1:
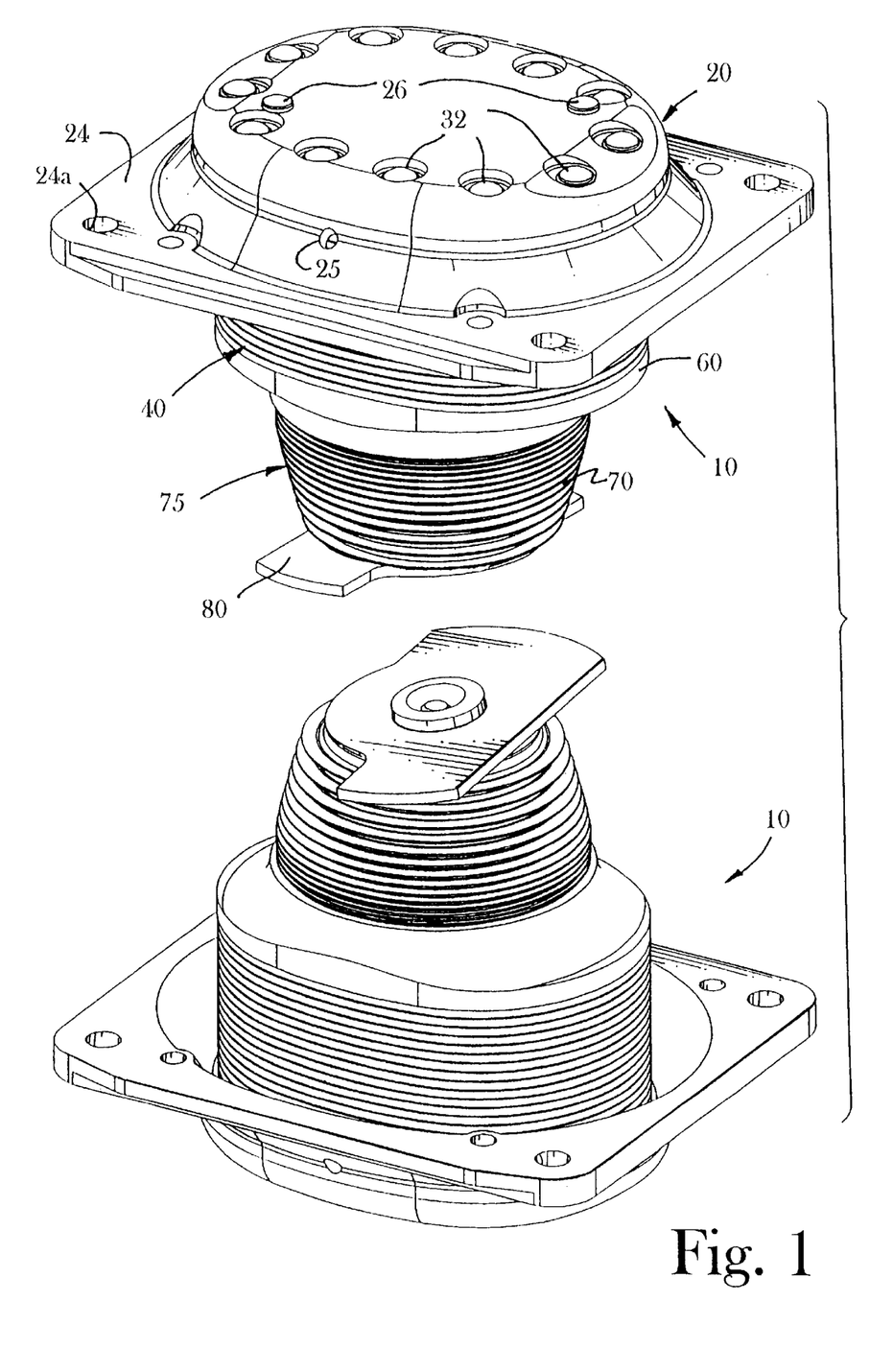
FIG. 1 is a perspective view of a pair of opposed fluid dampers according to the present invention.
Figure 2:
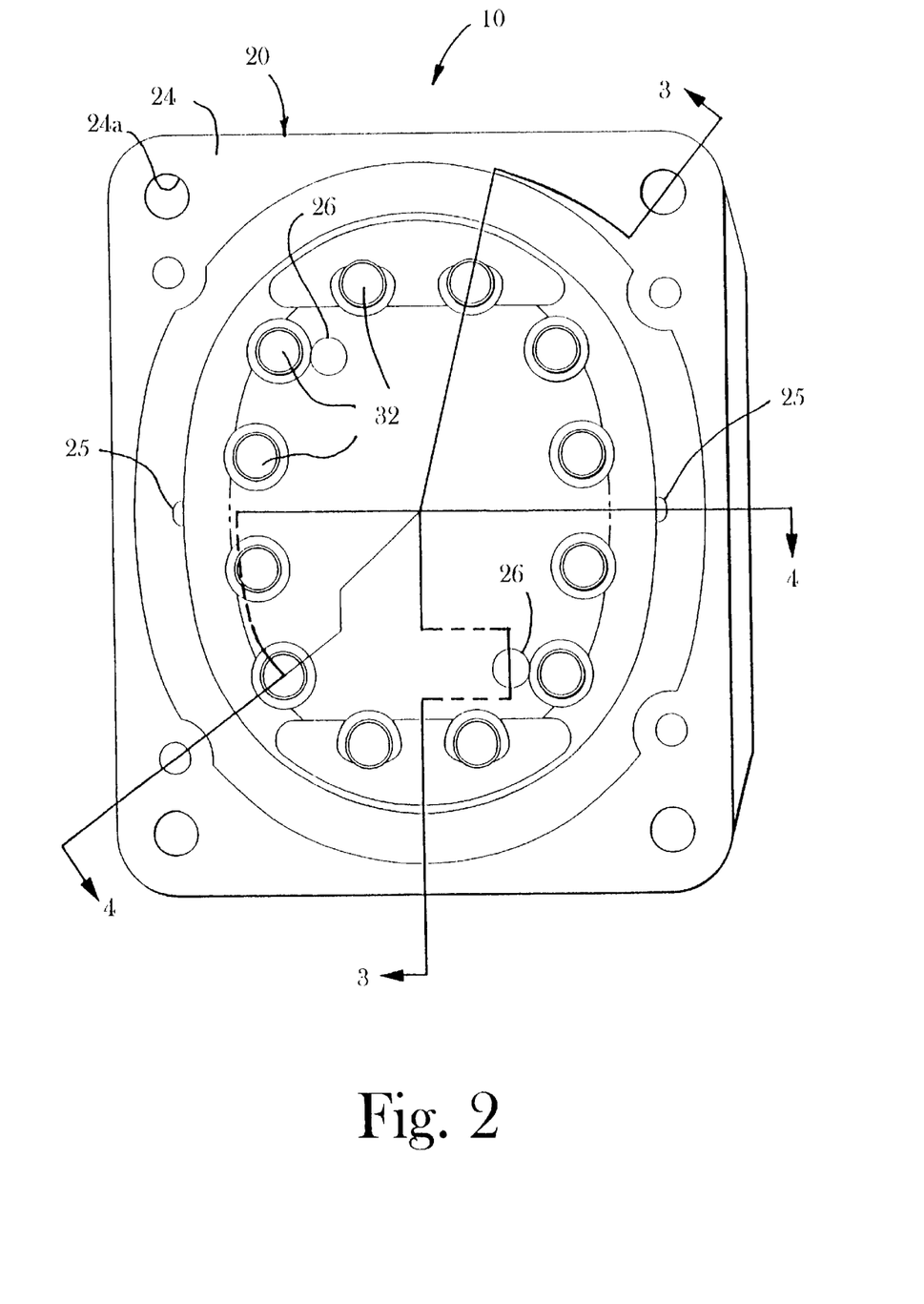
FIG. 2 is a top plan view of a damper as shown in FIG. 1.
Figure 3:
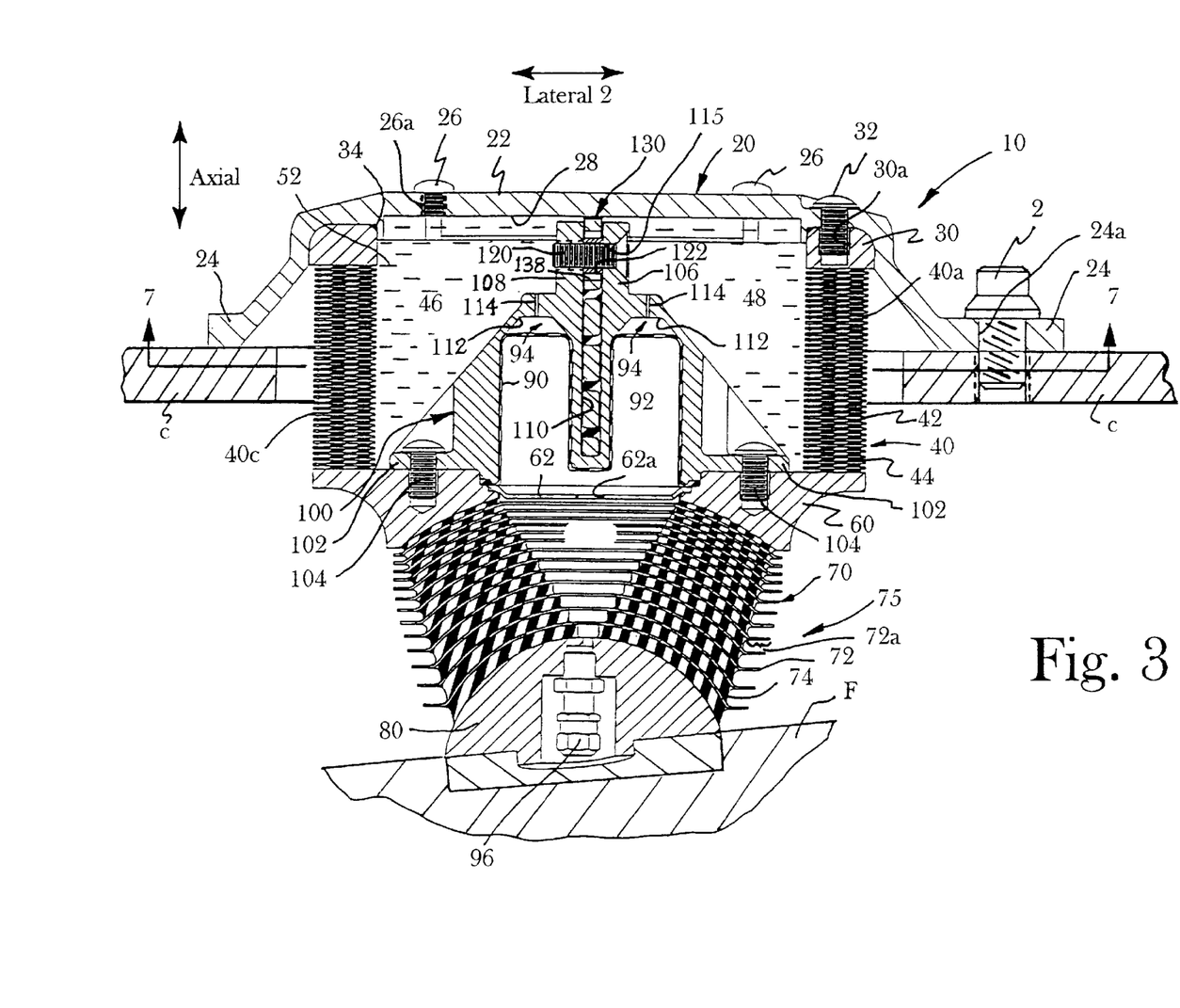
FIG. 3 is a cross-sectional view of the damper of FIG. 2 taken along the line 3—3 of FIG. 2, wherein the damper is shown mounted on a cuff and a composite rotor flexure of a helicopter, and wherein the opposing end portions of the elastomer section and outer member have been omitted for clarity.
Figure 4:
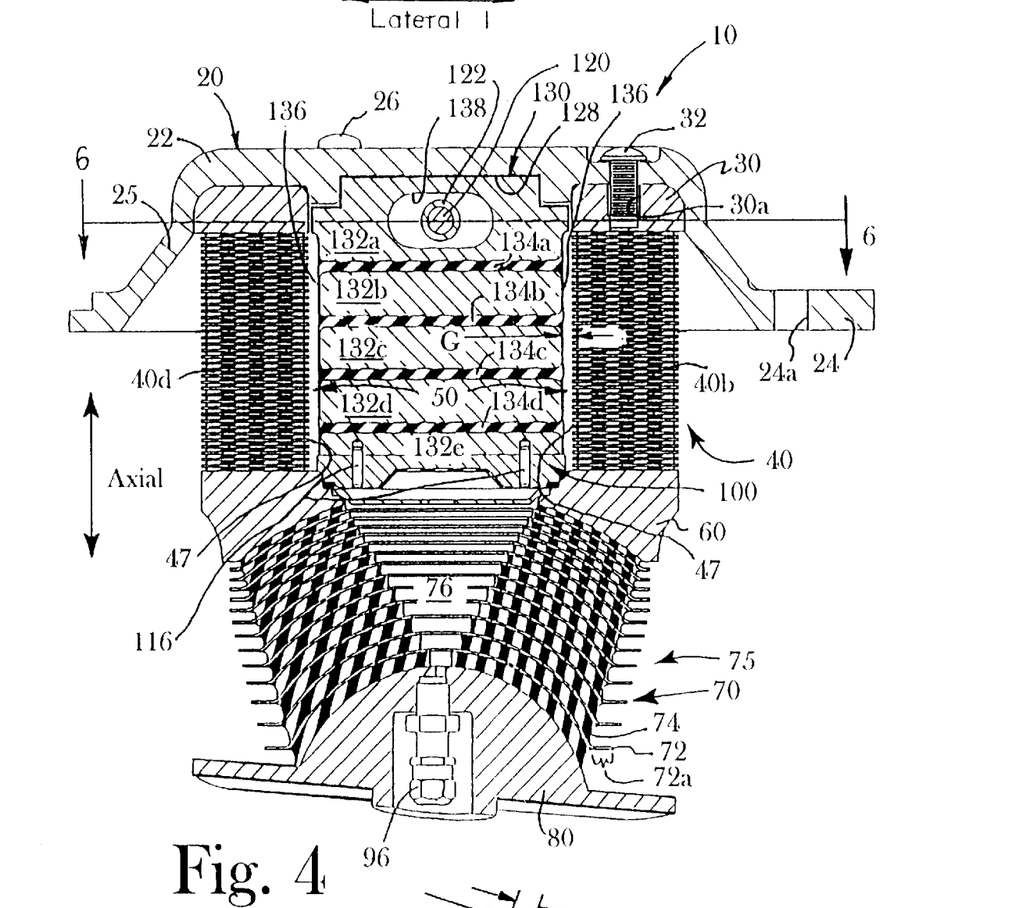
FIG. 4 is a cross-sectional view of the damper of FIG. 2 taken along the line 4—4 of FIG. 2 and wherein the opposing end portions of the elastomer section and the outer member have been omitted for clarity.

With reference to the figures, and as best seen in FIGS. 1, 3 and 4, a fluid and elastomer damper 10 according to the present invention is shown. In FIG. 3, an embodiment of the damper 10 is shown installed in the environment of a bearingless rotor system. The bearingless rotor system generally includes a rotor flexure F which is preferably of composite construction and which attaches to a mast (not shown) of a helicopter. A blade (not shown) is connected to the flexure F. The rotor system also includes a rotor cuff C which surrounds a portion of the rotor flexure F shown; both of which are preferably formed of composite construction. A pitch horn (not shown) is generally attached to the cuff C such that pitch control can be imparted to the cuff C and rotor blades (not shown). As is conventional, the cuff C, flexure F and blade (not shown) all attach at a point outboard from the damper 20. While only a single damper 10 is shown in FIG. 3, a second damper 10 is preferably mounted on the opposite side of the flexure F and the adjacent portion (not shown) of the cuff C.

The damper includes an outer member 20, a flexible elastomer section 40, an inner member 60, and a spherical centering bearing 75. The centering bearing 75 includes a flexible elastomer section 70 and a base member 80. The outer member 20 may be mounted on the helicopter cuff C with the base member 80 mounted on the helicopter rotor flexure F (see FIG. 3).

When the damper 10 is so mounted, lead-lag motions of the blade, which are conveyed through the cuff C, are damped by relative oscillation between the outer member 20 and the inner member 60. More particularly, the elastomer section 40 interconnects the outer member 20 and the inner member 60 and exhibits a relatively high spring rate in an Axial direction (see FIGS. 3 and 4) and a relatively low spring rate in radial directions Lateral 2 and Lateral 1 (see FIGS. 3, 6 and 7). The elastomer section 40 thereby serves to hysteretically damp the helicopter rotor system.

Additionally, fluid damping is provided by fluid 52 which substantially fills variable volume chambers 46, 48 and interconnecting passageways 50. As the outer member 20 and the inner member 60 are relatively displaced in the Lateral 2 direction, the fluid 52 is forced past a damping plate 130 (through passageways 50) from one chamber 46 to the other 48. Accordingly, and as described in more detail below, lead-lag vibrations along the Lateral 2 direction are damped both by hysteretic damping and fluid damping.

To accommodate motions, due to centrifugal forces and/or dynamic oscillatory motions, the elastomer section 40 is flexible in a Lateral 1 direction (see FIGS. 4–7 and 9). As described more fully below, the damper 10 is provided with a flexible damping plate 130 which, along with inner surfaces 47 of the elastomer section 40, defines the working passages 50. As the elastomer section 40 flexes in the Lateral 1 direction, the profiles of the inner walls 47 change. In order to maintain working passages 50 which provide the same or similar damping force, the flexible damping plate 130 flexes to present edge 136 profiles complementary to those of the adjacent elastomer section inner walls 47. In this way, the fluid damping of the damper 10 for oscillation in the Lateral 2 direction is maintained substantially uniform irrespective of oscillations or static offset in the Lateral 1 direction.

Turning now to the construction of the damper 10 in more detail, the outer member 20 is best seen in FIGS. 1–4. The outer member 20 includes a plate 22 and an annular member 30 secured to the inner surface of the plate 22 by bolts 32 which are received in threaded bores 30a thereof. An O-ring 34 is provided between the plate 22 and the annular member 30. Alternatively, the plate 22 and annular member 30 may be adhesively bonded to each other.

Preferably, the plate 22 and the annular member 30 are each formed of anodized aluminum or other suitable material. The plate 22 includes a circumferential flange 24 having a plurality of mounting holes 24a formed therein to receive bolts 2 (see FIG. 3) for securing the plate 22 to the helicopter cuff C or some other suitable substrate. A slot 28 extending lengthwise in the Lateral 2 direction and widthwise in the Lateral 1 direction is formed in the inner surface of the plate 22 (see FIGS. 3,4 and 7). A pair of fill holes 26a are formed in the plate 22 and are plugged by sealed screw 26. The fill holes 26a may be used to fill, drain and refill and/or bleed air from each of the chambers 46 and 48. Drain holes 25 for rain drainage are also formed in the plate 22.

Figure 7:
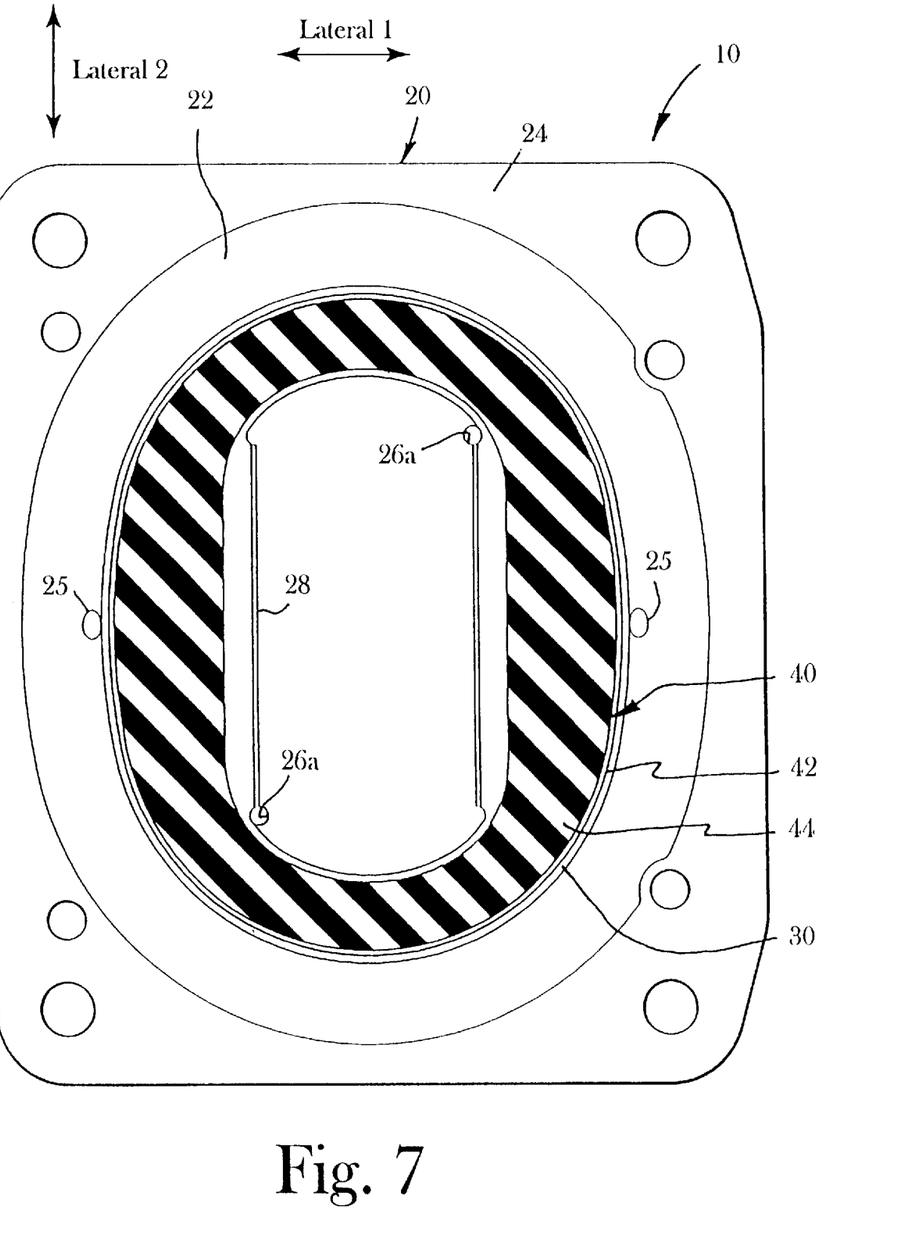
FIG. 7 is a cross-sectional view of the damper of FIG. 2 taken along the line 7—7 of FIG. 3, wherein the riser, the damping plate and the diaphragm have been omitted for clarity.
Figure 8:
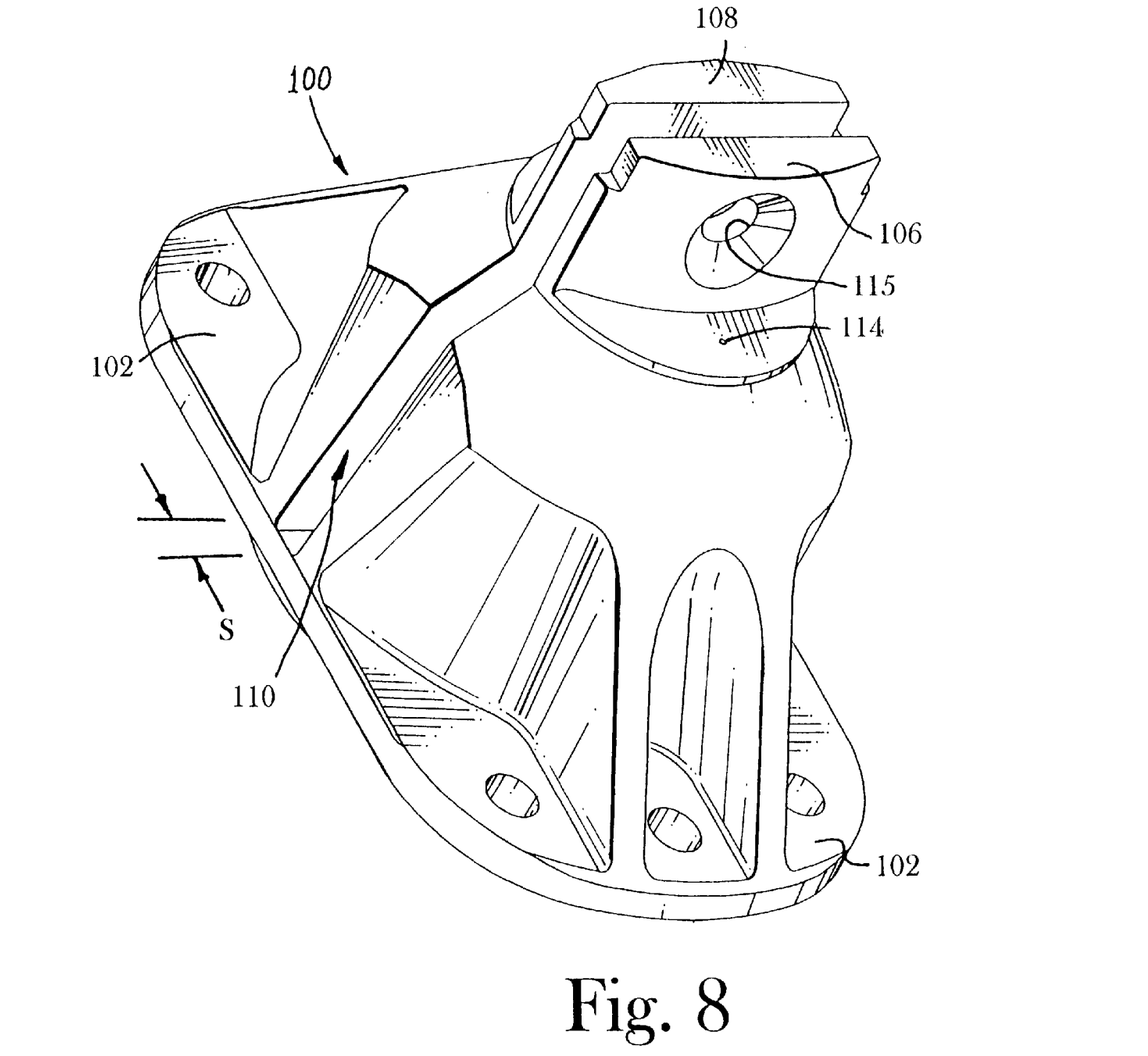
FIG. 8 is a perspective view of a riser forming a part of the damper of FIG. 2.

The elastomer section 40 has a generally "race track" shape (see FIG. 7). The elastomer section 40 completely wraps around the riser 100 and the damping plate 130 and defines a central cavity which includes the chambers 46 and 48. The elastomer section 40 has a laminated shim and elastomer construction including alternating, bonded layers of shims 42 and elastomer 44. The shims 42 and elastomer layers 44 are flat and extend in a plane perpendicular to the Axial direction, which is the line of vertical flap load application. Because of the inherent incompressibility of elastomer layers that are constrained, adding shims 42 in a laminated configuration substantially increases the axial stiffness in the Axial direction, while only changing the shear stiffness (e.g., in the Lateral 2 and Lateral 1 directions) by a modest amount. The uppermost elastomer layer 44 is secured, and preferably integrally bonded, to the annular member 30 and the lowermost elastomer layer 44 is secured, and preferably bonded, to the upper face of the inner member 60. For explanation purposes, and clarity in interpreting the drawings, the respective sidewalls of the elastomer section 40 are designated 40A, 40B, 40C and 40D.

The elastomer layers 44 may be a natural rubber, a synthetic rubber, a blend of natural and a synthetic rubbers, a silicone rubber, or the like. Preferably, the elastomer layers 44 are formed of a natural rubber elastomer with a loss factor (tan delta) between about 0.08 and 0.18. The shims 42 may be aluminum, brass, steel, titanium, plastic, composite, or other suitable material.

With reference to FIGS. 3, 4, 6, 8 and 9, a riser 100 is mounted within the cavity defined by the elastomer section 40. The riser 100 is fixedly secured to the inner member 60 by integral flanges 102 and bolts 104. In the riser 100, a wall 106 is positioned adjacent to the chamber 46 and a wall 108 is positioned adjacent to the chamber 48 and together define a slot 110. The slot 110 extends depth wise in the Axial direction and lengthwise in the Lateral 1 direction. A bore 115 is formed through each of the walls 106, 108 along the Lateral 2 direction. A screw 120 extends through the bore 115 and a an annular spacer 122 locate in slot 110 serve to maintain a constant width S of the slot 110. Internal, connected cavities 112 are formed in the riser 100. Additionally, pinhole passages 114 are formed in the riser and provide static fluid communication between the chambers 46, 48 and the compensation cavities 112. The riser 100 is preferably formed of aluminum and is anodized for corrosion protection. The passageways are appropriately small such that they block dynamic fluid flow at the operating frequencies of interest.

As best seen in FIGS. 4, 5, 9, 11, 12 and 13, the flexible damping plate 130 includes rigid bars 132a, 132b, 132c, 132d and 132e (collectively, 132a–e) separated by elastomer layers 134a, 134b, 134c and 134d (collectively, 134a–d ). The bars 132a–e are preferably formed of aluminum. The elastomer layers 134a–d are preferably formed of a natural rubber, synthetic rubber or a synthetic rubber blend. The damping plate 130 may have different numbers of bars and elastomer layers than as shown in the figures. Moreover, the term "bars" is not intended to be limiting and contemplates the use of relatively thin (thickness-wise) plates and relatively thin (height-wise) shims.

Preferably, the elastomer layers 134*a–d* are integrally bonded with the bars 132*a–e*. Further, the bars and the elastomer layers are preferably fully enveloped, with the exception of the holes 131 and the elongated hole 138 and bottom surface 141, in a relatively thin skin 135 of elastomer material which is integrally formed with the elastomer layers 134*a–d*.

Figure 12:
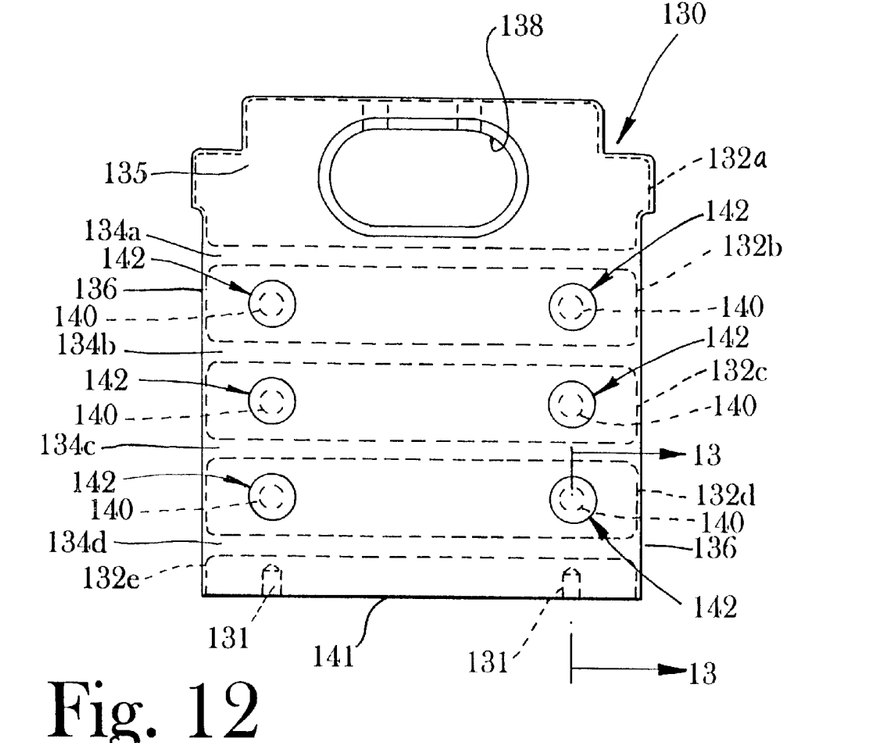
FIG. 12 is a front plan view of the flexible damping plate of FIG. 11.
Figure 13:
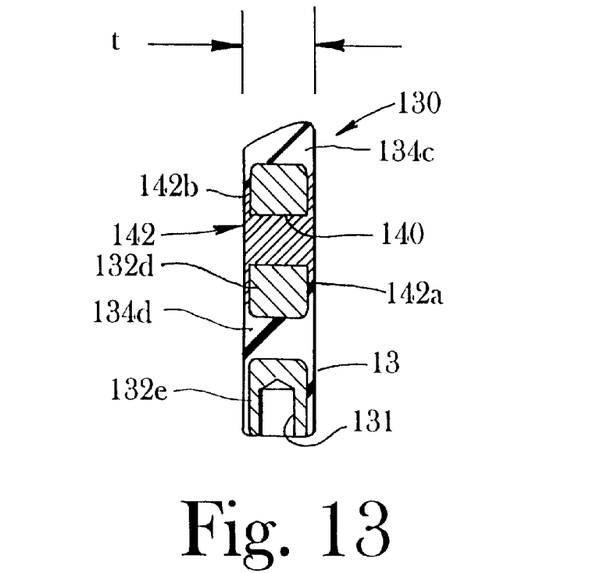
FIG. 13 is a partial, cross-sectional view of the flexible damping plate of FIG. 11.

With reference to FIGS. 12 and 13, each of the bars 132*b*, 132*c* and 132*d* has holes 140 formed therethrough. Each of these holes 140 is filled with a plug 142 of epoxy or similar material. Each of the plugs 142 has opposed flanges 142*a* and 142*b*. The holes 140 serve to receive pins for locating the bars in the mold during the elastomer molding process and are thereafter filled with the epoxy material.

Figure 6:
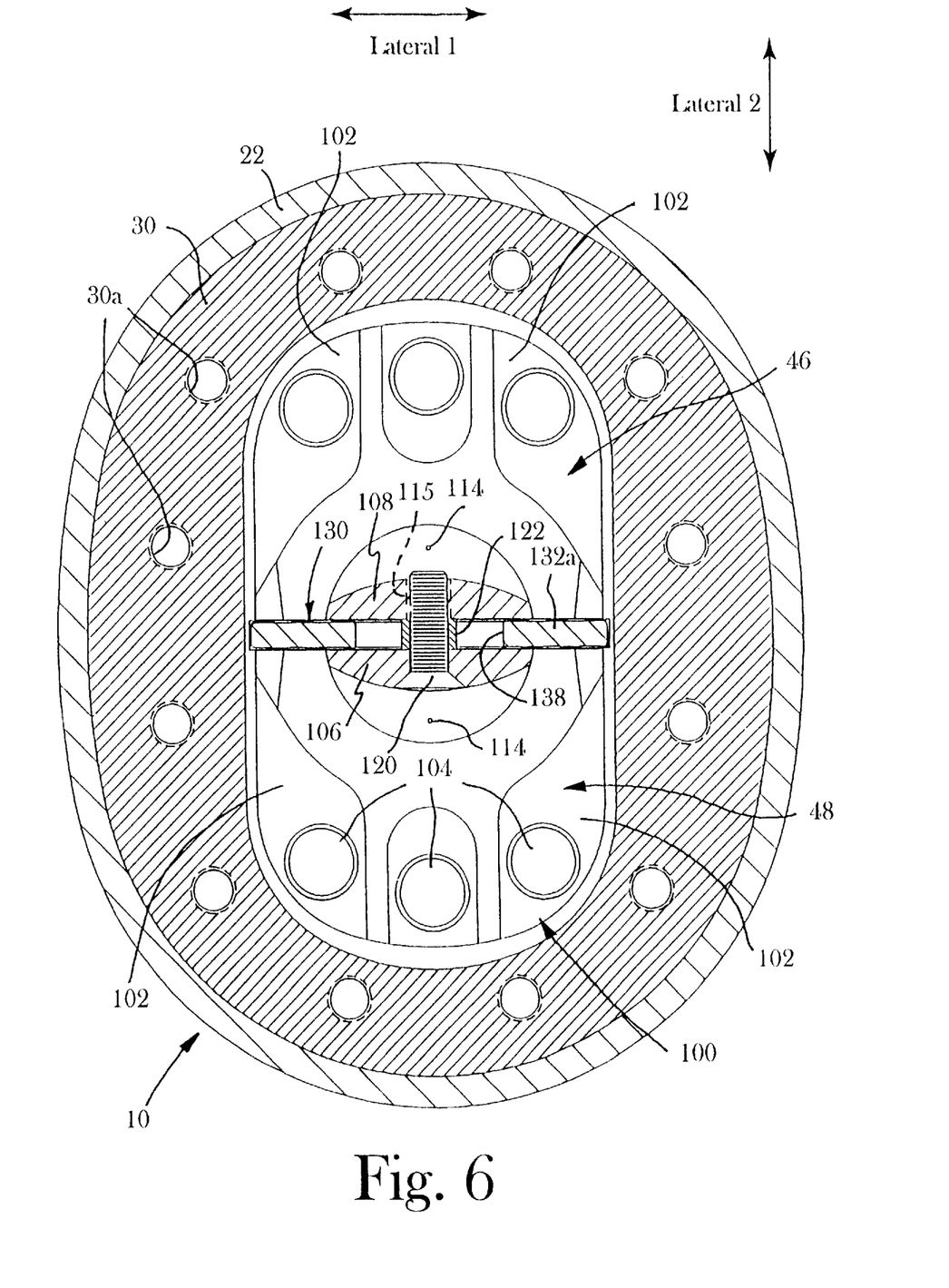
FIG. 6 is a cross-sectional view of the damper of FIG. 2 taken along the line 6—6 of FIG. 4 with portions of the outer member removed for clarity.

As best seen in FIGS. 3, 4 and 6, the flexible damping plate 130 is mounted in the slot 110 of the riser 100 such that portions of the damping plate 130 are slidable relative to the slot 110 along the Lateral 1 direction. Preferably, the thickness dimension t (see FIG. 13) of the damping plate 130 is close to the width dimension S (see FIG. 8) of the slot 110 to minimize movement between the damping plate and the riser 100 in the Lateral 2 direction as the fluid is forced past the damping plate. More preferably, the width S is no more than 0.090 inch (2.29 mm) greater than the thickness t. However, some clearance should be provided to prevent the damping plate from unduly chafing when the elastomer layers 134*a–d* are compressed and bulged by axial loading.

Figure 5:
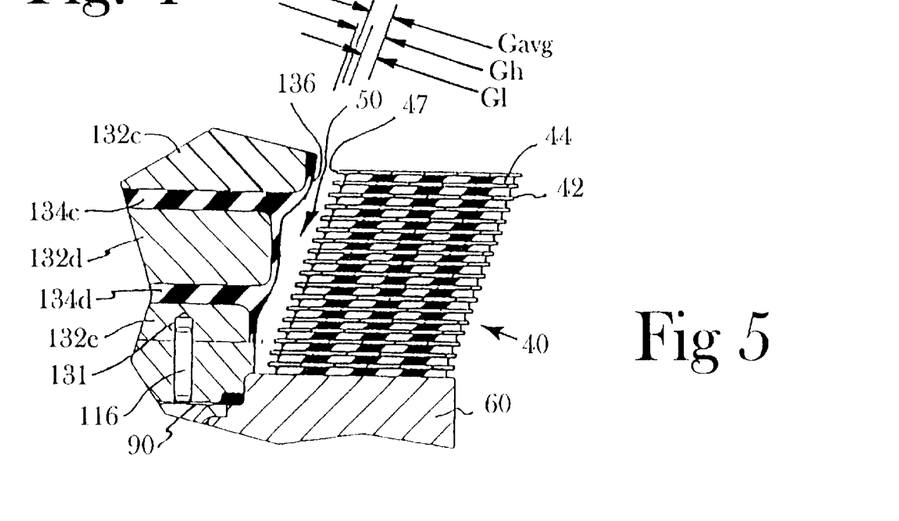
FIG. 5 is a partial, cross-sectional view of the damper of FIG. 2, wherein the damper is shown flexed.
Figure 9:
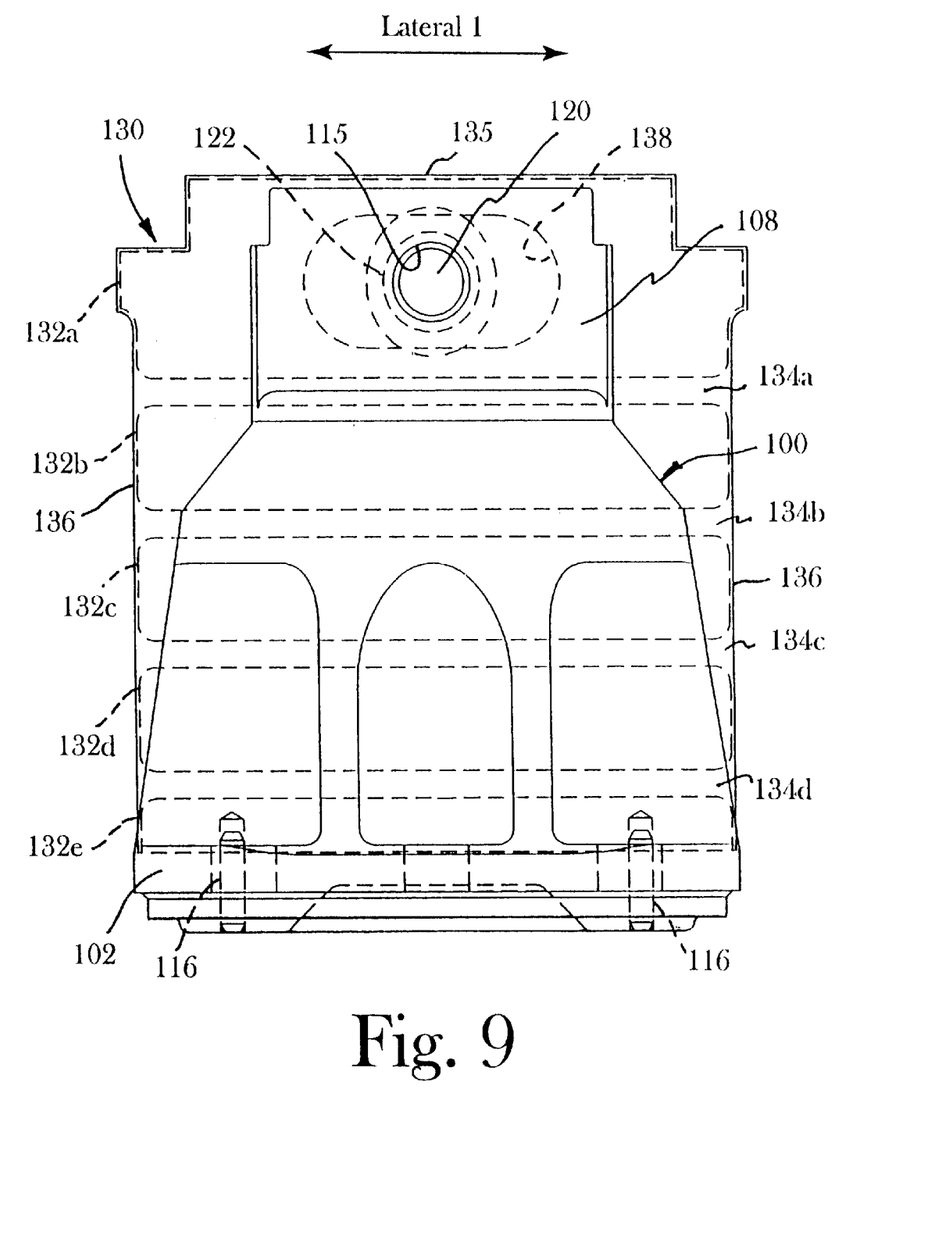
FIG. 9 is a front elevational view of the riser of FIG. 8 and the flexible damping plate of the damper of FIG. 2.

As shown in FIGS. 4 and 9, the lower end of the damping plate 130 is connected to the riser 100 by pins 116 which extend into bores 131 (FIG. 5). The screw 120 extends through the bore 115 of the riser, through the spacer 122 which is received in the hole 138 of the damping plate, as shown in FIGS. 3, 4 and 9. An upper portion of the bar 132*a* of the damping plate 130 is positioned in the slot 28 of the outer plate 22. Preferably, the received portion of the bar 132*a* and the slot 28 are relatively sized and shaped such that the bar 132*a* may slide freely along the slot 28 in the Lateral 2 direction with only a thin film of fluid 52 present between the slot 28 and the bar 132 when the fluid is pumped between the chambers 46 and 48.

As will be appreciated from the foregoing description, the upper portion of the damping plate 130 is slidable in the Lateral 2 direction relative to the outer member 20. Further, the bar 132*e* of the damping plate 130 is substantially fixed relative to the outer member 60 and the damping plate 130 is generally fixed relative to the inner member 60 in the Lateral 2 direction.

The outer member 20, the elastomer section 40, the inner member 60, the riser 100 and the damping plate 130 define the fully enclosed chambers 46 and 48. The inner surfaces 47 of the elastomer section walls 40*b* and 40*d* each define with a respective side edge 136 of the damping plate 130 a respective working passageway 50 having a gap width G. The gap width G is preferably between about 0.030 inch (0.762 mm) and 0.3 inch (7.62 mm), and more preferably is about 0.050 inch (1.27 mm). As the outer member 20 oscillates relative to the inner member 60 in the Lateral 2 direction, the fluid 52 is pumped from the chamber 46 to the chamber 48 and from the chamber 48 to the chamber 46 through the passageways 50, resulting in fluid damping of the oscillation. By way of example, the fluid is preferably a silicone liquid and exhibits a kinematic viscosity of between about 1,000 and 100,000 centistokes and more preferably about 20,000 centistokes.

When the damper 10 is in a relaxed state as shown in FIGS. 4 and 6, the gap widths G are uniform throughout the lengths of the working passageways 50 to provide prescribed working passageway areas. When the elastomer section 40 is flexed (i.e., the outer member 20 and the inner member 60 are relatively displaced, for example, because of vibration from the flexure F or static offset between the members), the damper 10 will assume a flexed position as shown in FIG. 5. As the outer member 20 is displaced in the Lateral 1 direction, the upper bar 132*a* of the damping plate 130 is displaced along therewith whilst the lower bar 132*e* is displaced with riser 100. In turn, each of the elastomeric layers 134*a–d* is flexed in shear to allow the connected bars 132*b–d* on either side thereof to move laterally in tandem with the elastomer section walls 40*a* and 40*d*.

Thus, in the same manner as each elastomer section wall 40*b*, 40*d* is secured at its opposed ends to the outer member 20 and the inner member 60 and flexes therebetween; likewise, the flexible damping plate 130 is secured at its opposed ends to the outer member 20 and the inner member 60 in the Lateral 1 direction only, allowing the damping plate 130 to conform to or assume substantially the same flex angle as the adjacent elastomer section walls 40*b* and 40*d*. This allows for an average gap dimension which is substantially constant. For example, as best shown in FIG. 5, flexing the damping plate 130 causes each layer (e.g. 134*c*, 134*d* shown), to shear. However, the elastomer directly adjacent the ends of the various bars (e.g. 132*c*, 132*d*) does not flex, thus throughout the length of the working gap 50, the gap dimension changes from a high gap width Gh to a low gap width GI. However, on average, the gap width Gavg remains approximately equal to G (the unflexed gap dimension). Such flexure in the Lateral 1 direction is not inhibited by the riser 100 because of the provision of the slot 110 and elongated hole 138. Notably, the riser 100 tapers inwardly in the Axial direction from the inner member 60 to the outer member 20 so that the riser does not interfere with the flexed elastomer section walls 40*b*, 40*d* (see FIG. 9).

A number of significant advantages are obtained by the provision of a flexible damping plate 130 in a damper 10 as described above. First, the damper 10 maintains substantially the same passageway 50 areas so that, when the elastomer section 40 is flexed in the Lateral 1 direction, substantially the same fluid damping force is generated as when the elastomer section 40 is not flexed in the Lateral 1 direction.

Additionally, it is not necessary to provide extra setoffs between the side edges 136 of the damping plate 130 and the adjacent inner surfaces 47 of the elastomer section walls 40*b*, 40*d* to prevent contact therebetween when the elastomer section 40 is flexed in the Lateral 1 direction. Therefore, smaller passageway gaps G may be used. This in turn allows the use of lower viscosity damping fluids. Lower viscosity fluids are typically less temperature dependent, i.e., they exhibit lesser viscosity changes as a result of changes in temperature than do similar type, more viscous fluids. Accordingly, the damper 10 allows for more efficient damping and more uniform damping over wider temperature ranges. Also, lower viscosity fluids typically exhibit less shear thinning so that more uniform damping may be achieved over greater vibration amplitude ranges.

Preferably, and as shown in FIGS. 1, 3 and 4, the inner member 60 is mounted on the flexure F by a spherical centering bearing 75. The bearing 75 includes a base member 80 interconnected to the inner member 60 by an elastomer section 70. Preferably, the elastomer section 70 is constructed of a laminated elastomer and shim construction, the shims 72 and the elastomer layers 74 being integrally bonded together. The elastomer section 70 defines an inner cavity 76. Preferably, the shims 72 are provided with brims 72A which provide a fail-safe interlock mechanism in the event of failure of the elastomer and overpivoting of the inner member 60 about the base member 80. These brims 72A also serve to dissipate heat, thereby extending the service life of the elastomer layers 74. The elastomer section 70 may be formed of materials as discussed above with regard to the elastomer section 40.

Figure 10:
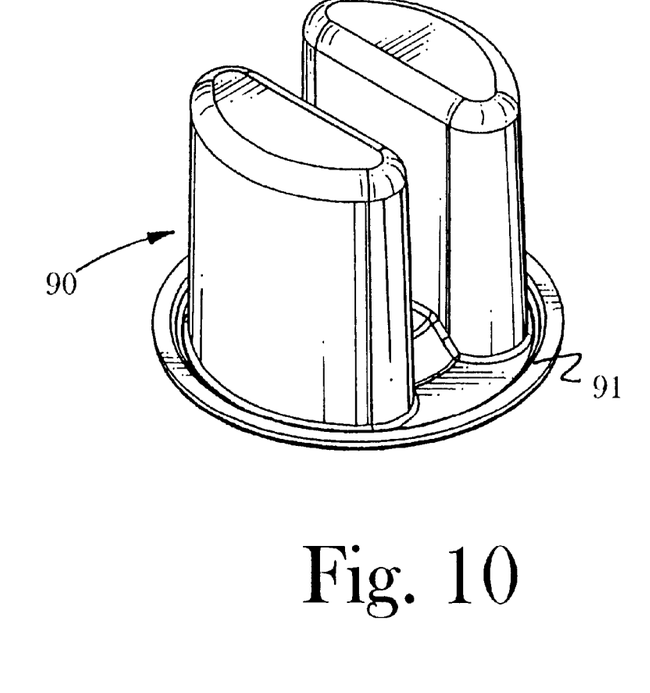
FIG. 10 is a perspective view of a diaphragm of FIG. 2.
Figure 11:
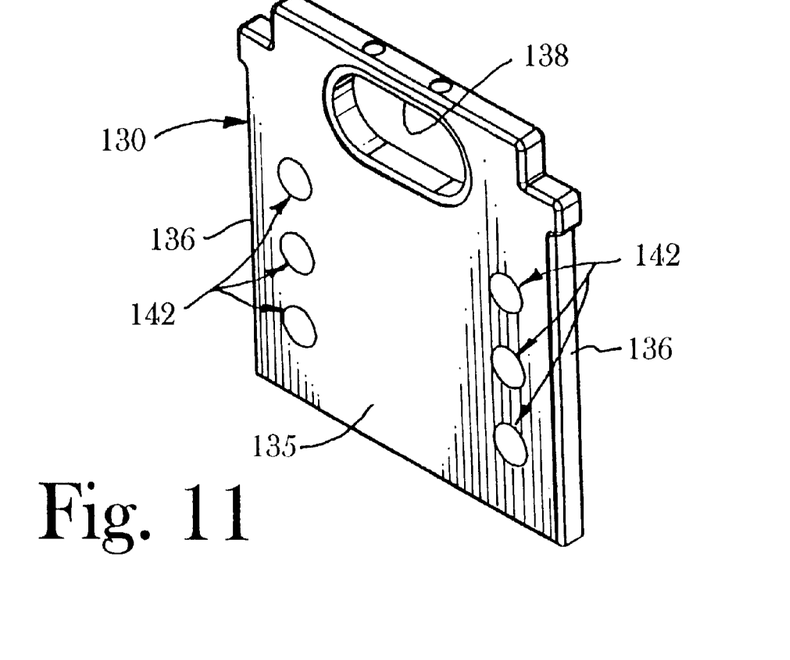
FIG. 11 is a perspective view of the flexible damping plate of FIG. 2.

Preferably, and as shown in FIGS. 3 and 4, the damper 10 is provided with a volume compensator system to accommodate changes in the volume of the fluid 52 caused by changes in the temperature of the fluid. An elastomeric air bladder 90 (also shown separately in FIG. 10) is positioned in the cavities 112 of the riser 100 as shown in FIG. 3 and separates the liquid 52 in liquid containing chambers 94 from the gas in gas containing chambers 92. A flange or bead 91 (FIG. 10) of the bladder 90 is clamped between the riser 100 and the inner member 60 to provide an air-tight seal. The bladder 90 divides the cavities 112 into variable volume chambers 92 and 94. The fluid 52 may pass between the chambers 46, 48 and the chambers 94 through the pinhole passages 114. The chamber 92 fluidly communicates with the cavity 76 through a hole 62a in a plate 62. The pressure in the cavity 92 may be regulated by use of a fill valve 96 or the like.

The volume compensator system will compensate for, i.e., allow, volume expansion and contraction of the fluid 52 due to temperature changes and eliminate undesirable pressure buildups within the damper 10. The passageways 114 should be small enough and long enough to allow interaction only in a static fashion. The fluid passageways 114 will hydrodynamically lock up at higher frequencies above about1 to 2 Hz. The pressure in the chamber 92 may be selected as required to prevent cavitation of the fluid 52 while undergoing large transient motion conditions. The damper 10 may include an inner bearing other than the centering bearing 75 described or may be used without an additional bearing device.

The foregoing is illustrative of the present invention and is not to be construed as limiting thereof. Although an exemplary embodiment of this invention has been described, those skilled in the art will readily appreciate that many modifications are possible without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiment disclosed, and that modifications to the disclosed embodiments, as well as other embodiments, are intended to be included within the scope of the appended claims. The invention is defined by the following claims, with equivalents of the claims to be included therein.

What is claimed is:

1. A fluid and elastomer damper, comprising:
   (a) a first member;
   (b) a second member;
   (c) an elastomer section flexibly mounting said second member to said first member, said elastomer section having an inner wall;
   (d) said first member, said second member and said elastomer section defining a cavity;
   (e) a damping fluid disposed within said cavity; and
   (f) a flexible damping plate separating said cavity into first and second chambers and forming at least one passageway between said damping plate and said inner wall, said passageway having a gap dimension, whereby, when movement occurs between said first and second members in a first lateral direction, said gap dimension is maintained substantially constant by flexing of said damping plate.

2. A damper of claim 1 wherein said flexible damping plate is mounted for movement with at least one of said first member and said second member in a second lateral direction transverse to said first lateral direction.

3. A damper of claim 1 wherein said flexible damping plate includes an elastomer layer which allows said damping plate to flex along said first lateral direction.

4. A damper of claim 1 wherein said flexible damping plate includes a plurality of elastomer layers which allow said damping plate to flex along said first lateral direction.

5. A damper of claim 1 wherein said flexible damping plate includes an elastomer layer and a rigid bar laminated with said elastomer layer, said elastomer layer allowing said damping plate to flex along said first lateral direction.

6. A damper of claim 1 wherein said flexible damping plate includes an elastomer layer having first and second opposed surfaces and at least two rigid bars secured to respective ones of said first and second opposed surfaces, said elastomer layer allowing said damping plate to flex along said first lateral direction.

7. A damper of claim 1 wherein said damping plate includes a plurality of flexible elastomer layers interposed between and secured to a plurality of substantially rigid bars, said elastomer layers allowing said damping plate to flex along said first lateral direction.

8. A damper of claim 1 including means for restraining movement of said damping plate in a second lateral direction substantially perpendicular to said first lateral direction.

9. A damper of claim 8 wherein said means for restraining comprises a restraint member including first and second walls positioned on either side of and adjacent said flexible damping plate, said first and second walls defining a guide slot within which said damping plate may move in said first lateral direction.

10. A damper of claim 9 wherein said restraint member is mounted for movement in said second lateral direction with one of said first member and said second member, and said damping plate is mounted for movement in said second lateral direction with said restraint member.

11. A damper of claim 9 further comprising a volume compensator passage formed in said restraint member whereby portions of said fluid may enter and exit said cavity responsive to changes in a temperature of said damper.

12. A damper of claim 1 wherein:
   said first and second members are relatively movable in a second lateral direction substantially perpendicular to said first lateral direction, and
   said first member includes a slot formed therein, an end of said damping plate being received in said slot, said slot being configured such that said first member is movable independently of said damping plate in said second lateral direction and, when said first member moves in said first lateral direction, said end of said damping plate is thereby moved in said first lateral direction and said damping plate is flexed along said first lateral direction.

13. A damper of claim 12 wherein a second end of said damping plate opposite said first end is mounted for movement with said second member in said first lateral direction.

14. A damper of claim 1 including a volume compensator system for controlling a pressure within said first cavity, said compensator system comprising a second cavity formed within a riser assembly and a compensator passage fluidly connecting said first and second cavities.

15. A damper of claim 14 wherein said compensator system further includes:
   a diaphragm positioned in said second cavity and fluidly separating said second cavity into third and fourth chambers, said third chamber being in fluid communication with said compensator passage, and
   a pressure control device located within a spherical bearing adjacent to said elastomer section and operable to control a pressure of said fourth chamber whereby said pressure of said first cavity is controlled.

16. A damper of claim 1 wherein said elastomer section further comprises a plurality of substantially rigid shims and a plurality of flexible elastomer layers interleaved therewith.

17. A damper of claim 1 further comprising a spherical elastomer bearing connected to said second member.

18. A damper of claim 1 wherein said first member is adapted to be mounted on a cuff of a helicopter and said second member is adapted to be interconnected to a flexure of the helicopter.

19. A fluid and elastomer damper, comprising:
   (a) a first member;
   (b) a second member;
   (c) an elastomer section flexibly mounting said second member to said first member and allowing lateral movement therebetween, said elastomer section including an inner wall;
   (d) said first member, said second member and said elastomer section at least partially defining a cavity;
   (e) a damping fluid disposed within said cavity; and
   (f) a flexible damping plate separating said cavity into first and second chambers, said flexible damping plate including a side edge cooperating with said inner wall to form a fluid passageway having a gap dimension therebetween, wherein, when said inner wall is displaced along said first lateral direction, said damping plate is flexed along said first lateral direction a corresponding distance thereby maintaining said gap dimension substantially constant.

20. A fluid and elastomer damper, comprising:
   (a) a first member;
   (b) a second member;
   (c) an elastomer section flexibly mounting said second member to said first member and allowing lateral movement therebetween, said elastomer section having an inner wall;
   (d) said first member, said second member and said elastomer section at least partially defining a cavity;
   (e) a damping fluid disposed within said cavity; and
   (f) a flexible damping plate separating said cavity into first and second variable volume chambers and forming at least one passageway between said damping plate and said inner wall, said at least one passageway including a gap dimension, wherein, when lateral movement occurs between said first and second members in a first lateral direction, said gap dimension is maintained substantially constant by flexing of said damping plate along said first lateral direction, said flexible damping plate being mounted for movement with at least one of said first member and said second member in a second lateral direction transverse to said first lateral direction whereby said damping plate displaces a portion of said fluid between said first and second chambers to provide a damping force in said second lateral direction.

21. A fluid and elastomer damper, comprising:
   (a) a first member;
   (b) a second member;
   (c) an elastomer section flexibly mounting said second member to said first member and allowing lateral movement therebetween, said elastomer section having an inner wall;
   (d) said first member, said second member and said elastomer section at least partially defining a cavity;
   (e) a damping fluid disposed within said cavity; and
   (f) a flexible damping plate including rigid upper and lower portions immovably mounted to said first and second members in a first lateral direction, said flexible damping plate separating said cavity into first and second variable volume chambers and forming at least one passageway between said damping plate and said inner wall, said passageway having a gap dimension, wherein, when lateral movement occurs between said first and second members in said first lateral direction, said gap dimension is maintained substantially constant by flexing of said damping plate along said first lateral direction between said rigid upper and lower portions whereby said damping plate displaces a portion of said fluid between said first and second chambers to provide a damping force in a second lateral direction.

22. A damped helicopter rotor system, comprising:
   (a) a rotor flexure adapted to be connected to a helicopter blade;
   (b) a rotor cuff adjacent and spaced apart from said rotor flexure; and
   (c) a damper including:
      (i) a first member connected to said rotor cuff;
      (ii) a second member connected to said rotor flexure;
      (iii) an elastomer section flexibly mounting said second member to said first member and allowing lateral movement therebetween, said elastomer section including an inner wall displaceable along a lateral direction;
      (iv) said first member, said second member and said elastomer section defining a cavity;
      (v) a damping fluid disposed within said cavity; and
      (vi) a flexible damping plate separating said cavity into first and second chambers and having a side edge, said damping plate being flexible along said lateral direction, said side edge and said inner wall forming a fluid passageway having a gap dimension therebetween, wherein, when said inner wall is displaced along said lateral direction, said damping plate is flexed along said lateral direction a corresponding distance thereby maintaining said gap dimension substantially constant.

* * * * *